United States Patent
Ollila

(10) Patent No.: US 11,758,077 B1
(45) Date of Patent: Sep. 12, 2023

(54) EMPLOYING SEQUENCES OF LIGHT PATTERNS TO SYNCHRONIZE CAMERAS

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 21 days.

(21) Appl. No.: 17/720,496

(22) Filed: Apr. 14, 2022

(51) Int. Cl.
*H04N 5/12* (2006.01)
*G06T 7/521* (2017.01)
*G06T 7/80* (2017.01)

(52) U.S. Cl.
CPC .............. *H04N 5/12* (2013.01); *G06T 7/521* (2017.01); *G06T 7/85* (2017.01)

(58) Field of Classification Search
CPC .............. H04N 5/12; G06T 7/521; G06T 7/85
USPC ......................................................... 348/131
See application file for complete search history.

(56) References Cited

U.S. PATENT DOCUMENTS

| 11,393,114 B1* | 7/2022 | Ebrahimi Afrouzi ........................ G01C 21/3848 |
| 2016/0163054 A1* | 6/2016 | Izadi ...................... H04N 23/11 348/164 |
| 2017/0324949 A1* | 11/2017 | Chen ..................... H04N 13/239 |
| 2019/0215486 A1* | 7/2019 | Venshtain .............. H04N 23/60 |
| 2021/0144220 A1* | 5/2021 | Zavesky ............... H04L 67/131 |

* cited by examiner

*Primary Examiner* — Susan E. Torgerson
(74) *Attorney, Agent, or Firm* — ZIEGLER IP LAW GROUP, LLC

(57) ABSTRACT

Disclosed is a system (100) comprising server(s) (102) communicably coupled to devices (104a, 104b, 202a-202c). Server(s) is/are configured to: receive depth information generated by said device using active illuminator and active sensor; detect when at least two devices are in same surroundings, based on at least partial matching of depth information received from at least two devices; and send instructions to at least two devices to generate new depth information by: controlling active illuminator (106a) of one of at least two devices (104a, 202a) to project sequence of light patterns on same surroundings, whilst switching off active illuminator (106b) of another of at least two devices (104b, 202b), and controlling first active sensor (108a) of one of at least two devices and second active sensor (108b) of another of at least two devices to sense simultaneously reflections of sequence of light patterns.

16 Claims, 3 Drawing Sheets

EMPLOYING SEQUENCES OF LIGHT PATTERNS TO SYNCHRONIZE CAMERAS

TECHNICAL FIELD

The present disclosure relates to systems for employing sequences of light patterns to synchronize cameras. The present disclosure relates to methods for employing sequences of light patterns to synchronize cameras.

BACKGROUND

In recent times, there has been an ever-increasing demand for developing interactive visual content, for example, such as immersive extended-reality (XR) environments, for various fields such as entertainment, real estate, training, medical imaging operations, simulators, navigation, and the like. Notably, for developing the interactive visual content, multiple active sensors (for example, such as infrared sensors, time-of-flight (ToF) sensors, structured-light sensors or similar) employed in a same real-world environment are required to be synchronised with each other, so that they do not interfere with each other. Without proper synchronisation, active sensors do not perform consistently and coherently. This is because active sensor data collected by such active sensors is often corrupted, and hence unusable.

Moreover, when multiple devices having active sensors are employed in the same real-world environment, it is desired to know accurately poses of these multiple devices in the real-world environment. Some existing techniques for determining poses utilize detectable markers (for example, such as a Quick Response (QR) code) of known shapes. Such markers are positioned at pre-known positions in the real-world environment. However, these techniques suffer from several disadvantages. Firstly, for utilizing such markers, 3D information (for example, such as depth information) of the real-world environment is required to be pre-known. Secondly, at a given point in time, a given active sensor can scan a limited area of the real-world environment only. Therefore, it is not possible to detect the available markers in each scan. Thirdly, implementations of such techniques are error-prone.

Therefore, in light of the foregoing discussion, there exists a need to overcome the aforementioned drawbacks associated with existing techniques for synchronizing active sensors of multiple devices present in the same real-world environment and determining poses of the active sensors in the real-world environment.

SUMMARY

The present disclosure seeks to provide a system for employing sequences of light patterns to synchronize cameras. The present disclosure also seeks to provide a method for employing sequences of light patterns to synchronize cameras. An aim of the present disclosure is to provide a solution that overcomes at least partially the problems encountered in prior art.

In one aspect, an embodiment of the present disclosure provides a system comprising at least one server that is communicably coupled to a plurality of devices and is configured to:
  receive, from each device, depth information indicative of shapes of surfaces present in surroundings of said device and optical depths of points on the surfaces with respect to said device, the depth information being generated by said device using an active illuminator and an active sensor of said device;
  detect when at least two devices from amongst the plurality of devices are in same surroundings, based on at least partial matching of respective depth information received from the at least two devices; and
  send instructions to the at least two devices to generate new depth information by:
    controlling a first active illuminator of one of the at least two devices to project a sequence of light patterns on the same surroundings, whilst switching off a second active illuminator of another of the at least two devices, and
    controlling a first active sensor of the one of the at least two devices and a second active sensor of the another of the at least two devices to sense simultaneously reflections of the sequence of light patterns off the same surroundings.

In another aspect, an embodiment of the present disclosure provides a method implemented by at least one server that is communicably coupled to a plurality of devices, the method comprising:
  receiving, from each device, depth information indicative of shapes of surfaces present in surroundings of said device and optical depths of points on the surfaces with respect to said device, the depth information being generated by said device using an active illuminator and an active sensor of said device;
  detecting when at least two devices from amongst the plurality of devices are in same surroundings, based on at least partial matching of respective depth information received from the at least two devices; and
  sending instructions to the at least two devices to generate new depth information by:
    controlling a first active illuminator of one of the at least two devices to project a sequence of light patterns on the same surroundings, whilst switching off a second active illuminator of another of the at least two devices, and
    controlling a first active sensor of the one of the at least two devices and a second active sensor of the another of the at least two devices to sense simultaneously reflections of the sequence of light patterns off the same surroundings.

Embodiments of the present disclosure substantially eliminate or at least partially address the aforementioned problems in the prior art, and enable efficient, accurate, real time or near-real time synchronization of cameras (i.e., active sensors) by way of employing sequences of light patterns.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings.

However, the present disclosure is not limited to specific methods and instrumentalities disclosed herein. Moreover, those skilled in the art will understand that the drawings are not to scale. Wherever possible, like elements have been indicated by identical numbers.

Figure 1:
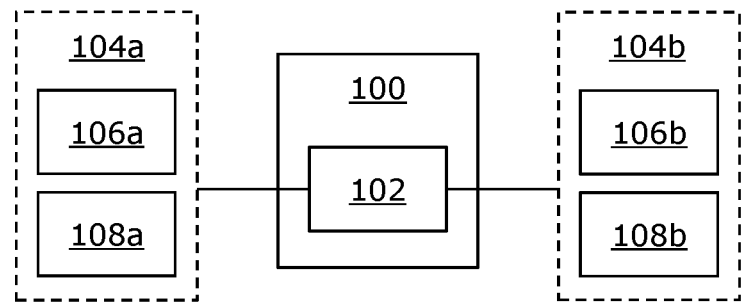
Figure 2A:
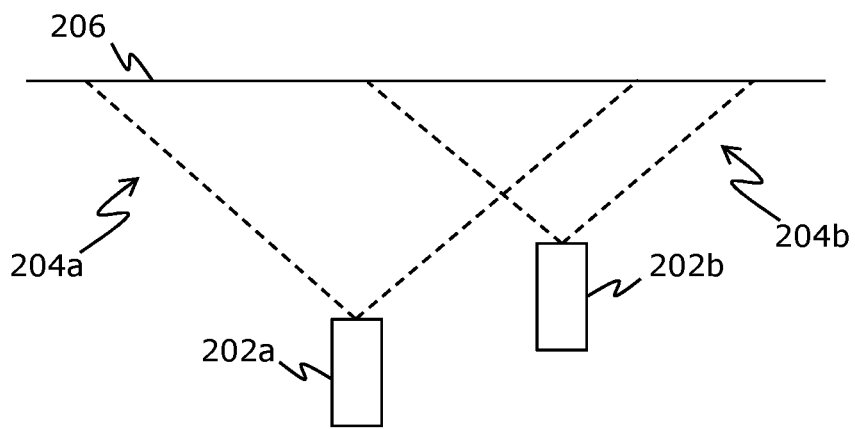
Figure 2B:
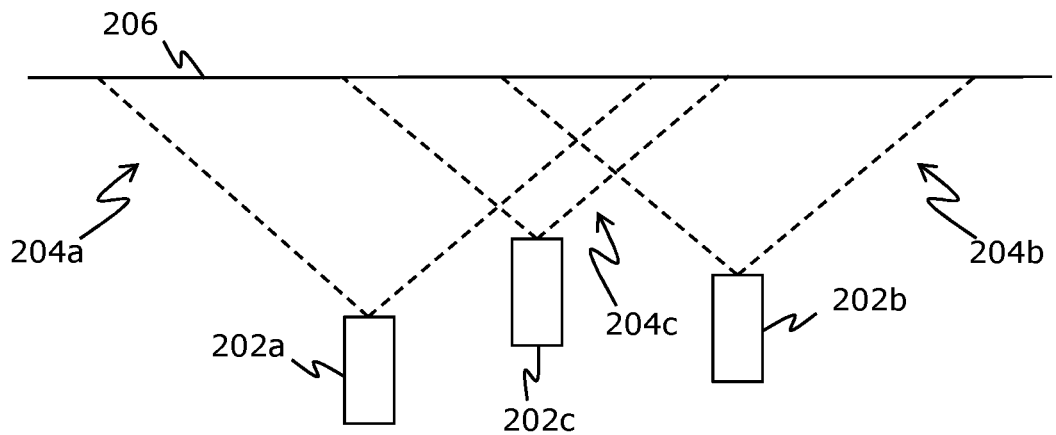
Figure 3A:
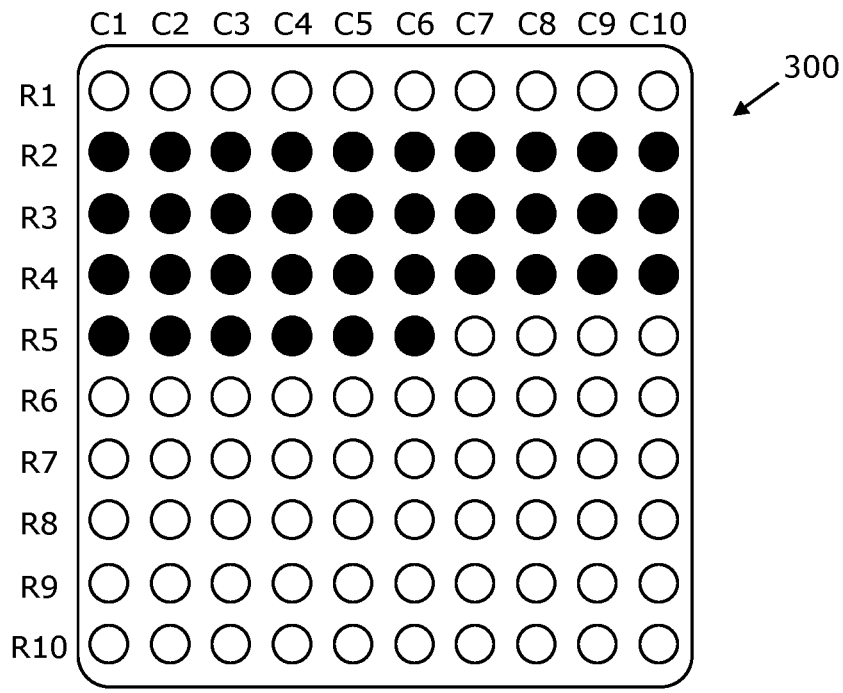
Figure 3B:
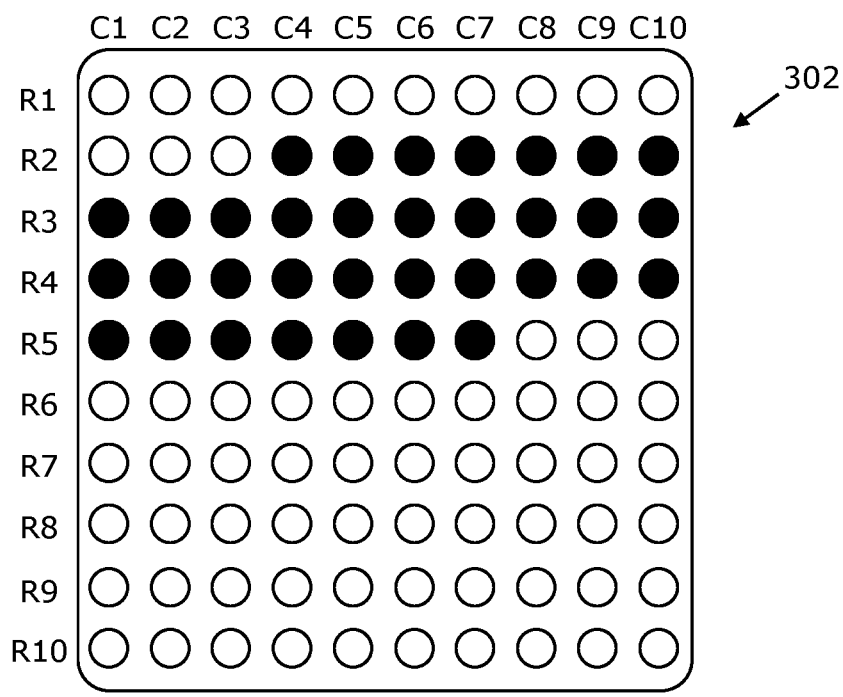
Figure 4:
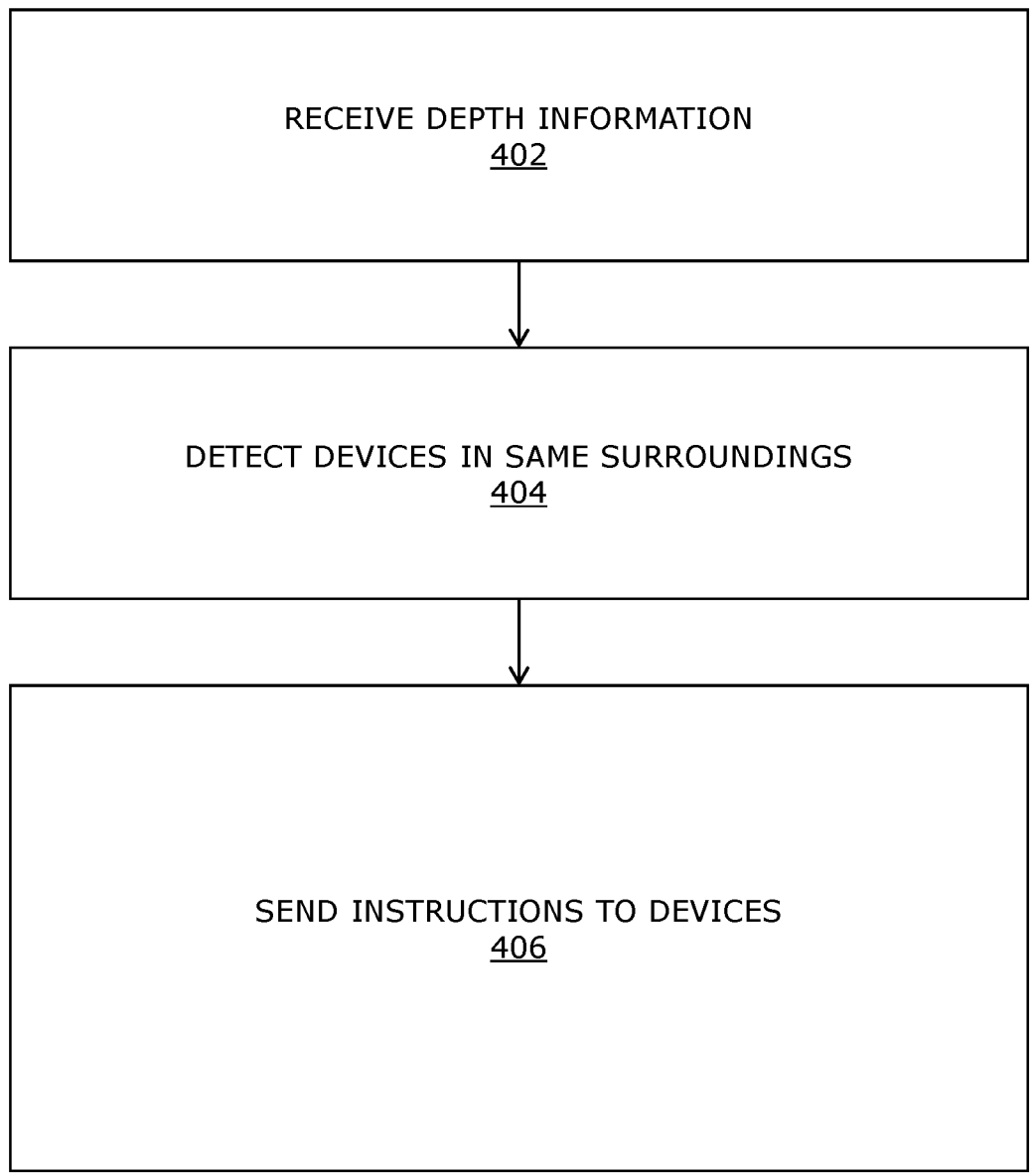

Embodiments of the present disclosure will now be described, by way of example only, with reference to the following diagrams wherein:

FIG. 1 illustrates a block diagram of architecture of a system for employing sequences of light patterns to synchronize cameras, in accordance with an embodiment of the present disclosure;

FIGS. 2A and 2B illustrate exemplary scenarios of selecting an active illuminator of a device to project a sequence of light patterns, in accordance with different embodiments of the present disclosure;

FIGS. 3A and 3B illustrate an exemplary first image captured by a first device and an exemplary second image captured by a second device, respectively, in accordance with an embodiment of the present disclosure; and FIG. 4 illustrates steps of a method for employing sequences of light patterns to synchronize cameras, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a system comprising at least one server that is communicably coupled to a plurality of devices and is configured to:
receive, from each device, depth information indicative of shapes of surfaces present in surroundings of said device and optical depths of points on the surfaces with respect to said device, the depth information being generated by said device using an active illuminator and an active sensor of said device;
detect when at least two devices from amongst the plurality of devices are in same surroundings, based on at least partial matching of respective depth information received from the at least two devices; and
send instructions to the at least two devices to generate new depth information by:
controlling a first active illuminator of one of the at least two devices to project a sequence of light patterns on the same surroundings, whilst switching off a second active illuminator of another of the at least two devices, and
controlling a first active sensor of the one of the at least two devices and a second active sensor of the another of the at least two devices to sense simultaneously reflections of the sequence of light patterns off the same surroundings.

In another aspect, an embodiment of the present disclosure provides a method implemented by at least one server that is communicably coupled to a plurality of devices, the method comprising:
receiving, from each device, depth information indicative of shapes of surfaces present in surroundings of said device and optical depths of points on the surfaces with respect to said device, the depth information being generated by said device using an active illuminator and an active sensor of said device;
detecting when at least two devices from amongst the plurality of devices are in same surroundings, based on at least partial matching of respective depth information received from the at least two devices; and
sending instructions to the at least two devices to generate new depth information by:
controlling a first active illuminator of one of the at least two devices to project a sequence of light patterns on the same surroundings, whilst switching off a second active illuminator of another of the at least two devices, and
controlling a first active sensor of the one of the at least two devices and a second active sensor of the another of the at least two devices to sense simultaneously reflections of the sequence of light patterns off the same surroundings.

The present disclosure provides the aforementioned system, and the aforementioned method for employing sequences of light patterns to accurately synchronize cameras (namely, active sensors). Herein, the at least one server sends requisite instructions to the at least two devices (when they are detected to be present in the same surroundings) in order to synchronize their active sensors. Beneficially, as a result, such active sensors perform consistently in real time or near-real time without any interference or lag. This may, for example, result in a realistic and immersive collaboration of active sensor data collected by the active sensors. The system is simple and robust. The method is fast, effective, reliable and can be implemented with ease.

Throughout the present disclosure, the term "server" refers to hardware, software, firmware or a combination of these that provides functionality by way of resources, data, services or programs to the plurality of devices. Notably, the at least one server detects the at least two devices that are present in the same surroundings, and sends the instructions to said devices for controlling their active illuminators and active sensors, so as to synchronize them in a manner that they perform consistently (without any interference). Optionally, the at least one server is implemented as a cloud server. Optionally, the system further comprises a data repository that is communicably coupled to the at least one server. Optionally, the at least one server is configured to store at least the depth information received from the at least two devices at the data repository. The data repository may be implemented as a memory of the at least one server, a cloud-based database, or similar.

Throughout the present disclosure, the term "surroundings" refers to a real-world environment whereat a given device is present. One or more of the plurality of devices could be arranged at fixed locations within the real-world environment. Optionally, in such a case, such devices are stationary in the real-world environment. Additionally or alternatively, one or more other of the plurality of devices could be wearable devices being worn by users present in the real-world environment. In such a case, the location of such a device changes with a change in a location of its user. Likewise, one or more of the plurality of devices could be arranged on, for example, drones, robots, or similar. As an example, a given device could be arranged on a support structure and is capable of a three-dimensional (3D) rotation (and additionally, capable of a translation motion). The support structure can be moved to any required location in the real-world environment.

It will be appreciated that the plurality of devices could comprise different types of devices present in the same surroundings. Some devices could be stationary in the same surroundings, while other devices could be movable in the same surroundings. In an example, the plurality of devices may comprise head-mounted display (HMD) devices, teleport devices, and the like. The term "head-mounted display" refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the given user. The term "extended-reality" encompasses virtual reality (VR), augmented reality (AR), mixed reality (MR), and the like. The term "teleport device" refers to a specialized equipment that is capable of facilitating virtual teleportation.

Optionally, when generating the depth information, (a processor of) the given device is configured to:
  control the active illuminator to project the sequence of light patterns onto the surroundings of the given device, whilst controlling the active sensor to detect reflections of the sequence of light patterns off the surroundings, wherein the reflections are detected from a given pose of the given device; and
  determine the depth information, based on the light patterns in the sequence and their detected reflections.

It will be appreciated that the (generated) depth information is optionally in a form of a point cloud. Such a point cloud is a data structure that represents the shapes of the surfaces present in the surroundings of the given device and the optical depths of the points on the surfaces with respect to the given device.

Throughout the present disclosure, the term "active illuminator" refers to an equipment that, in operation, projects (namely, emits) the sequence of light patterns onto objects in the surroundings. Notably, said light patterns are projected onto the surfaces (or their portions) present in the surroundings. Furthermore, the term "active sensor" refers to an equipment that is operable to sense and/or detect the reflections of the sequence of light patterns off the surroundings (or particularly, off the surfaces present in the surroundings). It will be appreciated that a given active illuminator and a given active sensor operate in conjunction with each other. In an implementation, the given active illuminator and given active sensor are integrated together into a single unit. It will also be appreciated that a given device may comprise one or more active illuminators and one or more active sensors. Also, a single device may comprise different types of active illuminators and active sensors.

Examples of the given active sensor include, but are not limited to, an infrared (IR)-light sensor, a Red-Green-Blue-Depth (RGB-D) sensor, a Light Detection and Ranging (LiDAR) sensor, a Time-of-Flight (ToF) sensor, a Sound Navigation and Ranging (SONAR) sensor, a structured-light sensor, a hyperspectral-light sensor. The ToF sensor could be a direct-type ToF sensor or an indirect-type ToF sensor. Examples of the given active illuminator include, but are not limited to, an IR-light illuminator, a visible-light illuminator, a structured-light illuminator, a hyperspectral-light illuminator. Optionally, the given active illuminator comprises a plurality of light-emitting elements. A given light-emitting element could be a light-emitting diode (LED), a projector, a display, a laser, or similar. The laser may be a vertical-cavity surface-emitting laser (VCSEL), an edge-emitting laser (EEL), or the like.

In some implementations, the sequence of light patterns is a structured light. Such a structured light could be a binary-coded structured light, a grey-coded structured light, a colour-coded structured light, or similar. It will be appreciated that the structured light could be a binary light pattern, a ternary light pattern, a k-ary light pattern, and the like. The technical benefit of employing the structured light is that it facilitates in generating accurate and precise depth information with a minimal projection time (namely, scanning time). The depth information generated by employing the structured light could be millimetre accurate.

In other implementations, the sequence of light patterns is similar to that produced by a light-emitting diode (LED) panel. Such a sequence of light patterns may comprise a number of light spots that are emitted sequentially, the light spots being arranged in a predefined manner or randomly. In such an implementation, the given active illuminator need not be implemented as a physical LED panel, but merely acts as a virtual LED panel. During this implementation, it is ensured that there is no occlusion (such as due to an object) in front of the given active illuminator.

Optionally, the given light pattern comprises at least two light spots (namely, light dots). The given light pattern could be a spatially-variable light pattern (wherein a density of light spots varies spatially across the given light pattern).

A manner in which the sequence of light patterns deforms upon striking the surfaces present in the surroundings allows for determining the shapes of the surfaces and the optical depths of the points on the surfaces with respect to the given device. The sequence of light patterns is deformed according to the shapes of the surfaces. A shape of a given surface could be cylindrical, spherical, conical, polygonal, freeform shape, and the like. The aforesaid deformation may also depend on a surface geometry of the given surface and/or a surface texture of the given surface. The surface geometry of the given surface could be planar (namely, flat), curved, freeform, or similar.

Optionally, the reflections of the sequence of light patterns as sensed by the given active sensor are processed to obtain a given image representing said reflections. The given image is indicative of the shapes of the surfaces present in the surroundings and the optical depths of the points on the surfaces with respect to the given device. Optionally, the given image is compared with a reference image of the sequence of light patterns in order to determine the shapes of the surfaces and the optical depths of the points on the surfaces with respect to the given device. In such a case, the given image and the reference image are compared to determine a local transverse shift of light spots of the light pattern, and such a local transverse shift is used to determine the aforesaid shapes and optical depths. The aforesaid shapes and optical depths could be also determined using a triangulation technique.

When the at least two devices are present in the same surroundings and when fields of view of the at least two devices overlap, the at least two devices would observe common region(s) and/or common surface(s) of the same surroundings. In such a case, said common region(s) and/or common surface(s) of the same surroundings are well-represented in the respective depth information received from the at least two devices, and thus there exists at least partial matching of the respective depth information. In this manner, the at least two devices are detected to be in the same surroundings.

Notably, the at least one server sends the instructions to the at least two devices in order to synchronize the first active sensor and the second active sensor. This is performed by projecting the sequence of light patterns using the first active illuminator, and sensing the reflections of the sequence of light patterns using the first active sensor and the second active sensor simultaneously. It will be appreciated that when the active sensors of the at least two devices are synchronized in the aforesaid manner, the first active sensor and the second active sensor perform consistently (without any interference or lag).

Optionally, the instructions comprise at least one of:
time slots in which an active illuminator of a given device is to project the sequence of light patterns,
time slots in which an active sensor of the given device is to sense the reflections of the sequence of light patterns,
a framerate at which the active illuminator of the given device is to project the sequence of light patterns,
a framerate at which the active sensor of the given device is to sense the reflections of the sequence of light patterns,
a wavelength of light to be employed by the active illuminator of the given device,
a wavelength of light to be sensed by the active sensor of the given device,
the sequence of light patterns to be projected by the active illuminator of the given device,
the sequence of light patterns to be sensed by the active sensor of the given device.

Herein, the term "time slot" refers to a time duration in which the active illuminator of the given device is to project the sequence of light patterns, or to a time duration in which the active sensor of the given device is to sense the reflections of the sequence of light patterns. A given time slot comprises a start time and an end time. Further, the term "framerate" refers to a rate of at which the active illuminator of the given device is to project the sequence of light patterns (for example, such as 'n' number of light patterns projected per unit time), or to a rate at which the active sensor of the given device is to sense the reflections of the sequence of light patterns (for example, such as 'n' number of light patterns sensed per unit time). It will be appreciated that, for the active illuminator of the given device that is actively illuminating the same surroundings, time slots and framerates would be same for projecting the sequence of light patterns and for sensing the reflections of the sequence of light patterns. Optionally, a number of time slots lies in a range of 2 to 32. As an example, the number of time slots may be from 2, 3, 5, 10 or 15 up to 10, 16, 24 or 32. Optionally, a given framerate lies in a range of 5 Hertz to 120 Hertz. As an example, the given framerate may be from 5, 10, 15, 30, 50 or 70 Hertz up to 45, 70, 95 or 120 Hertz. Optionally, the sequence of light patterns that constitute one cycle of light patterns is projected at a frequency that lies in a range of 0.1 milliseconds to 1000 milliseconds (i.e., 1 second).

In an example, three devices X1, X2, and X3 may be detected to be present in the same surroundings. An active illuminator of the device X1 may be employed to project the sequence of light patterns on the same surroundings, while active illuminators of the devices X2 and X3 may be switched off. The reflections of the sequence of light patterns are sensed by active sensors of all the three devices X1, X2, and X3 simultaneously. A time slot in which the active illuminator of the device X1 projects a first cycle of the sequence of light patterns, and the time slot in which the active sensors of all the three devices X1, X2, and X3 sense its reflections may be from a time instant T1 to a time instant T1+16 milliseconds. A time slot in which the active illuminator of the device X1 projects a second cycle of the sequence of light patterns, and the time slot in which the active sensors of all the three devices X1, X2, and X3 sense its reflections may be from the time instant T1+16 milliseconds to a time instant T1+32 milliseconds. A time slot in which the active illuminator of the device X1 projects a third cycle of the sequence of light patterns, and the time slot in which the active sensors of all the three devices X1, X2, and X3 sense its reflections may be from the time instant T1+32 milliseconds to a time instant T1+48 milliseconds.

It will be appreciated that the wavelength of light to be employed by the active illuminator of the given device and the wavelength of light to be sensed by the active sensor of the given device should be same. The wavelength of the light may be one of: a wavelength of an IR light, a wavelength of an ultraviolet (UV) light, a wavelength of a visible light. In an example, a wavelength of light to be employed by the first active illuminator may be 850 nanometres. In such a case, wavelengths of light to be sensed by the first active sensor and the second active sensor are same (i.e., equal to 850 nanometres). It will also be appreciated that the sequence in which the active illuminator of the given device projects the light patterns is same as the sequence in which the active sensor of the given device senses reflections of those light patterns. In an example, for five light patterns P1, P2, P3, P4, and P5, a sequence in which the first active illuminator projects the light patterns P1-P5 and a sequence in which the first active sensor senses reflections of the light patterns P1-P5 may be: P2, P1, P3, P4, P5.

Optionally, the one of the at least two devices is configured to:
capture at least one first image representing the reflections of the sequence of light patterns as sensed by the first active sensor;
receive, from the another of the at least two devices, at least one second image representing the reflections of the sequence of light patterns as sensed by the second active sensor, the at least one first image and the at least one second image being captured simultaneously;
analyse the at least one first image and the at least one second image, based on a framerate at which the light patterns of said sequence are projected, to determine an exposure time of the first active sensor, an exposure time of the second active sensor and a phase difference between the first active sensor and the second active sensor; and
send instructions to the another of the at least two devices to adjust the exposure time of the second active sensor to match the exposure time of the first active sensor whilst reducing the phase difference between the first active sensor and the second active sensor.

It will be appreciated that the aforementioned (synchronization) steps are optionally performed iteratively until exposure times of the first active sensor and the second active sensor match and the phase difference is zero. In this regard, first sensor data representative of the reflections of the sequence of light patterns as sensed by the first active sensor is subsequently processed (by the one of the at least two devices) to capture the at least one first image. Similarly, second sensor data representative of the reflections of the sequence of light patterns as sensed by the second active sensor is subsequently processed (by the another of the at least two devices) to capture the at least one second image and to send it to the one of the at least two devices. For the aforesaid processing, a given device may employ at least one image signal processing technique. It will be appreciated that simultaneously capturing the at least one first image and the at least one second image allows the one of the at least two devices to accurately determine the phase difference between the first active sensor and the second active sensor (i.e., a time lag between the first active sensor and the second active sensor in sensing the reflections of the sequence of light patterns). Greater the time lag, greater is the phase difference. When the first active sensor and the second active sensor are well-synchronized by implementing the aforesaid steps, such a phase difference is reduced, and preferably minimized. Moreover, it will also be appreciated that the same sequence of light patterns is used to generate the new depth information as well as to synchronise both the first active sensor and the second active sensor in terms of exposure time and phase.

Since the sequence of light patterns is projected by the first illuminator (of the one of the at least two devices), the framerate at which the light patterns of said sequence are projected is already and accurately known to the one of the at least two devices. Moreover, when the first illuminator acts as the virtual LED panel, a number of light spots emitted sequentially by the first illuminator are sensed by the first sensor and the second sensor, and are well-represented in the at least one first image and the at least one second image. Therefore, by utilizing the framerate and the number of light spots, the exposure time of the first active sensor, the exposure time of the second active sensor, and the phase difference can be easily and accurately determined by the one of the at least two devices. It is to be understood that greater the exposure time of a given active sensor, greater is the number of light spots being represented in a given image. The term "exposure time" refers to a time span for which a given active sensor of the given device is exposed to light so as to capture a given image representing the reflections of the sequence of light patterns. Optionally, when analysing the at least one first image and the at least one second image, the one of the at least two devices is configured to employ at least one image processing algorithm.

In an example, a framerate at which the light patterns of said sequence are projected may be or 333 Hertz, that is a new light spot is emitted every 3 milliseconds when the first illuminator acts as the virtual LED panel; the number of light spots represented in the at least one first image may be 36, and the number of light spots represented in the at least one second image may be 34. Herein, the exposure time of the first active sensor is determined to be 108 milliseconds (=3×36 milliseconds), whereas the exposure time of the second active sensor is determined to be 102 milliseconds (=3×34 milliseconds). Moreover, the phase difference may not be zero, if the first active sensor and the second active sensor start to sense the reflections at different time T and T', respectively. As a result, a position of a starting light spot represented in the at least one first image may be different from a position of a starting light spot represented in the at least one second image. As an example, a starting light spot represented in the at least one first image may be at a position L, whereas a starting light spot represented in the at least one second image may be at a position L'.

When the exposure time of the second active sensor is different from the exposure time of the first active sensor, and the phase difference is not zero, the one of the at least two devices sends the instructions to the another of the at least two devices to adjust (i.e., increase or decrease) the exposure time of the second active sensor until it matches with the exposure time of the first active sensor whilst minimizing the phase difference. The at least two devices are optionally communicably coupled to each other. It will be appreciated that the first active sensor is controlled by the one of the at least two devices to have an exposure time and a framerate that matches time slots and the framerate at which the light pattern is being projected by the first active illuminator.

Moreover, optionally, the at least one server is configured to select the first active illuminator of the one of the at least two devices to project the sequence of light patterns, when the first active sensor has a larger field of view than a field of view of the second active sensor. In this regard, the larger field of view of the first active sensor includes considerably larger region(s) and/or surface(s) of the same surroundings as compared to the field of view of the second active sensor. Thus, the sequence of light patterns is more likely to be well-projected by the first active illuminator (since the first active sensor has a considerably larger field of view, and thus a preferable view of the same surroundings for said projection, as compared to the second active sensor). Beneficially, in such a case, both the first active sensor and the second active sensor could easily simultaneously sense the reflections of the sequence of light patterns, as the sequence of light patterns would be projected (by the first active illuminator) onto larger region(s) and/or surface(s) of the same surroundings.

In an example, five devices K1, K2, K3, K4, and K5 may be present in the same surroundings and have an overlapping field of view, wherein an active sensor of the device K4 has a largest field of view amongst fields of view of active sensors of the five devices K1-K5. Therefore, in such a case, an active illuminator of the device K4 is selected to project the sequence of light patterns, while active illuminators of the remaining devices are switched off.

Optionally, the at least one server is configured to:
determine a device from amongst the at least two devices whose active sensor has a field of view that overlaps the most with fields of view of active sensors of other devices from amongst the at least two devices; and
select the determined device as the one of the at least two devices, wherein the active illuminator of the determined device is employed as the first active illuminator to project the sequence of light patterns.

In this regard, the overlapping field of view of the active sensor of said device would include those region(s) and/or surface(s) of the same surroundings that is/are common in (namely, shared by) fields of view of active sensors of the at least two devices. Thus, the sequence of light patterns is more likely to be well-projected by the active illuminator of the determined device whose active sensor has the most overlapping field of view (and thus a preferable view of the same surroundings for said projection, as compared to the active sensors of the other devices from amongst the at least two devices). Beneficially, in such a case, the active sensors of the at least two devices could easily simultaneously sense the reflections of the sequence of light patterns, as the sequence of light patterns would be projected (by the active illuminator of the determined device) onto the common region(s) and/or surface(s) of the same surroundings.

In an example, three devices A1, A2, and A3 may be present in the same surroundings in a manner that the device A2 is positioned between the devices A1 and A3. Fields of view of active sensors of the three devices A1, A2, and A3 may include a wall in the same surroundings. Herein, a field of view of an active sensor of the device A2 overlaps the most with fields of view of active sensors of both the devices A1 and A3. Therefore, the active illuminator of the device A2 is employed to project the sequence of light patterns, while active illuminators of the devices A1 and A3 are switched off.

Optionally, the at least one server is configured to:
receive, from the one of the at least two devices, information indicative of the light patterns in said sequence projected by the first active illuminator; and
send, to the another of the at least two devices, the information indicative of the light patterns.

In this regard, since the at least two devices could employ different light patterns (in said sequence) in the same surroundings, the another of the at least two devices needs to know the light patterns being projected by the first active illuminator when the first active sensor and the second active sensor are to simultaneously sense the reflections of the sequence of light patterns. Beneficially, this facilitates the second active sensor in accurately sensing the reflections of the sequence of light patterns, as the information indicative of the light patterns would be known to the another of the at least two devices prior to sensing said reflections. It will be appreciated that the information indicative of the light patterns is sent to the another of the at least two devices in real time or near-real time (without any latency). In an alternative implementation, this information could be sent to the another of the at least two devices by the one of the at least two devices itself.

Optionally, the at least one server is configured to:
determine relative poses of the at least two devices with respect to each other by using point-cloud registration on depth information received from the at least two devices; and
process the depth information received from the at least two devices, based on the relative poses of the at least two devices, to generate a three-dimensional model of the same surroundings.

Hereinabove and thereafter, the term "depth information" encompasses both the respective depth information as well as the new depth information. Optionally, the at least one server is configured to store the depth information along with information pertaining to the relative poses of the at least two devices at the data repository. The relative poses of the at least two devices are indicative of offsets between a pose of the one of the at least two devices and a pose of the another of the at least two devices. It will be appreciated that the point-cloud registration allows to determine a spatial transformation (for example, scaling, rotation, translation, skewing, and the like) that aligns the depth information received from the at least two devices, for determining said relative poses. Thus, the at least one server can accurately determine the relative poses of the at least two devices, based on the spatial transformation. Such relative poses are subsequently utilized by the at least one server in generating the 3D model of the same surroundings. It will be appreciated that the system eliminates the need for detectable markers for determining poses/relative poses of the devices.

Optionally, when determining the relative poses of the at least two devices using the point-cloud registration, the at least one server is configured to employ at least one point-cloud registration technique. Optionally, the at least one point-cloud registration technique is at least one of: an iterative closest point (ICP) technique, a trimmed iterative closest point (TrICP) technique, a point-to-plane ICP technique, a generalized ICP technique, a normal iterative closest point (NICP) technique, a robust point matching (RPM) technique, a kernel correlation (KC) technique, a coherent point drift (CPD) technique, a sorting the correspondence space (SCS) technique, a deep learning-based point-cloud registration technique. The deep learning-based point-cloud registration technique utilizes a deep learning model to solve geometric registration problems, and aims to overcome drawback(s) of conventional point-cloud registration technique(s). Such a deep learning model is trained in an end-to-end manner with different forms of supervision. Examples of the deep learning-based point-cloud registration technique include, but are not limited to, a PointNetLK technique, a deep closest point (DCP) technique, a partial registration network (PRNet) technique, a 3D match point-cloud registration technique, a point pair feature network (PPFNet) technique, and a deep global registration (DGR) technique. Such techniques are well-known in the art, and are typically employed in various applications (such as surface reconstruction, robot localization, simultaneous localization and mapping (SLAM), and the like).

In an example, when the depth information received from the at least two devices is in a form of points clouds, the point-cloud registration may be employed to determine translation, rotation and/or scaling as spatial transformations for aligning said point clouds. Typically, the ICP technique refines an initial estimate of a transformation between the point clouds, and then matches pairs of points between the points clouds. In such a technique, minimizing the Euclidean distance between corresponding points in the point clouds facilitates in estimating an accurate spatial transformation, which could be used as the initial estimate in a given iteration of the ICP technique. Some ICP-based techniques may fail to achieve an accurate alignment between said point clouds when the initial estimate is inaccurate; thus, only locally optimal solutions are obtained by such ICP-based techniques. In such a case, ICP-based techniques (for example, such as a globally optimal ICP (Go-ICP) technique, a fast global registration (FGR) technique, and the like) that offer global point-cloud registrations are employed. Furthermore, a class of algorithms may be developed to couple traditional feature descriptors with a random sample consensus (RANSAC) method, for facilitating a robust point-cloud registration. Moreover, the NICP technique is a variant of the ICP technique. The NICP technique considers each point in a given point cloud with local feature(s) of a surface (such as a normal surface and a curved surface) and a 3D structure characteristics around each point. The NICP technique is based on a least square formulation, with a reduced augmented-error metric.

Furthermore, the term "three-dimensional model" refers to a data structure that comprises comprehensive information pertaining to a 3D space of the same surroundings whereat the at least two devices are present. Such a comprehensive information is indicative of at least one of: surfaces or their portions present in the same surroundings, a plurality of features of objects or their portions present in the same surroundings, shapes and sizes of the objects or their portions, poses of the objects or their portions, colours of objects or their portions, light sources, lighting conditions within the same surroundings. The object could be a living object (for example, such as a human, a pet, a plant, and the like) or a non-living object (for example, such as a wall, a window, a toy, a poster, a lamp, and the like). Optionally, the 3D model is in a form of at least one of: a 3D polygonal mesh, a 3D point cloud, a 3D surface cloud, a 3D surflet cloud, a voxel-based model, a mathematical 3D surface model, a parametric model, a 3D grid, a 3D hierarchical grid, a bounding volume hierarchy. The 3D polygonal mesh could be a 3D triangular mesh, a 3D quadrilateral mesh, and the like. The mathematical 3D surface model may be based on a plane, a sphere, a cylinder, a box, or similar. For example, the mathematical 3D surface model may be a Non-uniform rational basis spline (NURBS) model. Optionally, the at least one server is configured to store the 3D model at the data repository.

Optionally, processing of the depth information based on the relative poses of the at least two devices allows the at least one server to utilize shapes of surfaces present in surroundings from perspectives of poses of the at least two devices and to utilize optical depths of points on the surfaces with respect to each of the at least two devices, when generating the 3D model. In such a case, the 3D model is accurately and comprehensively generated. It will be appreciated that when active sensors of the at least two devices are synchronized with each other, the 3D model is generated with a high accuracy.

Optionally, when processing the depth information to generate the 3D model, the at least one server is configured to employ at least one data stitching technique. Since the relative poses of the at least two devices are already and accurately known to the at least one server, the at least one data stitching technique enable the at least one server to determine a plurality of features that are common in the respective depth information (including the new depth information), and to align the respective depth information accordingly, and to stitch (i.e., merge) the respective depth information together for generating the 3D model. When aligning the respective depth information, the at least one data stitching technique may enable the at least one server to warp (namely, re-project) the respective depth information to a same coordinate system, and to perform at least one filtering operation on the respective depth information. The at least one filtering operation could be at least one of: a straight-pass filtering operation, a voxel-based filtering operation, a statistical filtering operation, a conditional filtering operation, a radius filtering operation. The at least one filtering operation may comprise one or more steps such as averaging, minimum filtering, maximum filtering, median filtering, denoising (for example, by using a moving least squares (MLS) method), and the like. It will be appreciated that upon performing such filtering operations, the respective depth information would be accurate and precise for subsequent merging. Upon merging the respective depth information, data points of the respective depth information may be uniformly re-sampled, for example, using a voxel down-sampling function of a point cloud library (PCL) software. This may beneficially relieve (i.e., remove) duplicated or over-densified data points. A resultant point cloud of a merged depth information may be sub-sampled and filtered to reduce a level of noise, for example by utilizing octree sub-divisions.

Optionally, the at least one data stitching technique comprises at least one feature extraction algorithm. Examples of the at least one feature extraction algorithm include, but are not limited to, an edge-detection algorithm (for example, such as a biased Sobel gradient estimator, a Canny edge detector, Deriche edge detector, and the like), a corner-detection algorithm (for example, such as Harris & Stephens corner detector, Shi-Tomasi corner detector, Features from Accelerated Segment Test (FAST) corner detector, and the like), a feature descriptor algorithm (for example, such as Binary Robust Independent Elementary Features (BRIEF), Gradient Location and Orientation Histogram (GLOH), and the like), and a feature detector algorithm (for example, such as Scale-Invariant Feature Transform (SIFT), Oriented FAST and rotated BRIEF (ORB), Speeded Up Robust Features (SURF), and the like).

Optionally, the at least one server is configured to:
determine relative poses of the at least two devices with respect to each other by using point-cloud registration on the depth information received from the at least two devices;
obtain information indicative of a pose of at least one of the at least two devices; and
determine poses of others of the at least two devices, based on the pose of the at least one of the at least two devices and the relative poses of the at least two devices.

The relative poses of the at least two devices are determined as discussed above. Optionally, the at least one server is configured to obtain the information indicative of the pose of the at least one of the at least two devices, from a computing device that is communicably coupled to pose-tracking means. Additionally or alternatively, optionally, the at least one server is configured to obtain the information indicative of the pose of the at least one of the at least two devices, from the at least one of the at least two devices itself. Optionally, in this regard, the at least one of the at least two devices comprises pose-tracking means.

Optionally, the computing device and/or the at least one of the at least two devices is/are configured to: process pose-tracking data, collected by the pose-tracking means, to determine the pose of the at least one of the at least two devices in a local coordinate space of the at least one of the at least two devices; and send, to the at least one server, the information indicative of the pose of the at least one of the at least two devices. The term "pose" encompasses both position and orientation.

The term "pose-tracking means" refers to a specialized equipment that is employed to detect and/or follow poses of the at least one of the at least two devices. The pose-tracking means may employ an outside-in tracking technique, an inside-out tracking technique, or a combination of both the aforesaid techniques, for collecting the pose-tracking data. Such techniques are well-known in the art. The pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Global Positioning System (GPS) tracking system.

Optionally, the computing device and/or the at least one of the at least two devices employ(s) at least one data processing algorithm to process the pose-tracking data. The pose-tracking data may be in form of images, IMU/TIMU values, motion sensor data values, magnetic field strength values, or similar. Correspondingly, requisite data processing algorithm(s) is/are employed to process the pose-tracking data, to determine the pose of the at least one of the at least two devices in the local coordinate space. Examples of the at least one data processing algorithm include a feature detection algorithm, an environment mapping algorithm, a pose data extrapolation algorithm, and the like. Furthermore, the term "local coordinate space" refers to a 3D space of surroundings of the at least one of the at least two devices that is represented by a local coordinate system. The local coordinate system defines a position within the 3D space of the surroundings. Optionally, the local coordinate system has a predefined origin and three mutually perpendicular coordinate axes. The three mutually perpendicular coordinate axes could be, for example, X, Y, and Z axes. Optionally, in this regard, the position in the local coordinate system is expressed as (x, y, z) position coordinates along the X, Y and Z axes, respectively.

It will be appreciated that provided the pose of the at least one of the at least two devices and the relative poses of the at least two devices, the at least one server can easily and accurately determine the poses of the others of the at least two devices. Optionally, when determining the poses of the others of the at least two devices, the at least one server is configured to employ at least one mathematical technique. Such a mathematical technique may be based on coordinate geometry.

The present disclosure also relates to the method as described above. Various embodiments and variants disclosed above, with respect to the aforementioned first aspect, apply mutatis mutandis to the method.

Optionally, the method further comprises sending instructions to the one of the at least two devices to:
capture at least one first image representing the reflections of the sequence of light patterns as sensed by the first active sensor;
receive, from the another of the at least two devices, at least one second image representing the reflections of the sequence of light patterns as sensed by the second active sensor, the at least one first image and the at least one second image being captured simultaneously;
analyse the at least one first image and the at least one second image, based on a framerate at which the light patterns of said sequence are projected, to determine an exposure time of the first active sensor, an exposure time of the second active sensor and a phase difference between the first active sensor and the second active sensor; and
send instructions to the another of the at least two devices to adjust the exposure time of the second active sensor to match the exposure time of the first active sensor whilst reducing the phase difference between the first active sensor and the second active sensor.

Optionally, the method further comprises selecting the first active illuminator of the one of the at least two devices to project the sequence of light patterns, when the first active sensor has a larger field of view than a field of view of the second active sensor.

Optionally, the method further comprises:
determining a device from amongst the at least two devices whose active sensor has a field of view that overlaps the most with fields of view of active sensors of other devices from amongst the at least two devices; and
selecting the determined device as the one of the at least two devices, wherein the active illuminator of the determined device is employed as the first active illuminator to project the sequence of light patterns.

Optionally, the method further comprises:
receiving, from the one of the at least two devices, information indicative of the light patterns in said sequence projected by the first active illuminator; and
sending, to the another of the at least two devices, the information indicative of the light patterns.

Optionally, the method further comprises:
determining relative poses of the at least two devices with respect to each other by using point-cloud registration on depth information received from the at least two devices; and
processing the depth information received from the at least two devices, based on the relative poses of the at least two devices, to generate a three-dimensional model of the same surroundings.

Optionally, the method further comprises:
determining relative poses of the at least two devices with respect to each other by using point-cloud registration on the depth information received from the at least two devices;
obtaining information indicative of a pose of at least one of the at least two devices; and
determining poses of others of the at least two devices, based on the pose of the at least one of the at least two devices and the relative poses of the at least two devices.

Optionally, in the method, the instructions comprise at least one of:
time slots in which an active illuminator of a given device is to project the sequence of light patterns,
time slots in which an active sensor of the given device is to sense the reflections of the sequence of light patterns,
a framerate at which the active illuminator of the given device is to project the sequence of light patterns,
a framerate at which the active sensor of the given device is to sense the reflections of the sequence of light patterns,
a wavelength of light to be employed by the active illuminator of the given device,
a wavelength of light to be sensed by the active sensor of the given device,
the sequence of light patterns to be projected by the active illuminator of the given device,
the sequence of light patterns to be sensed by the active sensor of the given device.

DETAILED DESCRIPTION OF THE DRAWINGS

Referring to FIG. 1, illustrated is a block diagram of architecture of a system 100 for employing sequences of light patterns to synchronize cameras, in accordance with an embodiment of the present disclosure.

The system 100 comprises at least one server (depicted as a server 102) that is communicably coupled to a plurality of devices (depicted as devices 104a and 104b). The device 104a comprises an active illuminator 106a and an active sensor 108a. The device 104b comprises an active illuminator 106b and an active sensor 108b. In an example, the device 104a may be one of at least two devices, and the device 104b may be another of the at least two devices. In such a case, the active illuminator 106a and the active sensor 108a may be referred to as a first active illuminator and a first active sensor, respectively. The active illuminator 106b and the active sensor 108b may be referred to as a second active illuminator and a second active sensor, respectively.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of devices and to specific numbers or types of active illuminators and active sensors in the devices. The person skilled in the art will recognize many variations, alternatives, and modifications of embodiments of the present disclosure. As an example, the system 100 further comprises a data repository (not shown) communicably coupled to the server 102.

Referring to FIGS. 2A and 2B, illustrated are exemplary scenarios of selecting an active illuminator of a device to project sequences of light patterns, in accordance with different embodiments of the present disclosure. In FIG. 2A, two devices 202a and 202b are shown to be present in same surroundings such that both the devices 202a and 202b are observing a surface 206 present in the same surroundings. A field of view 204a of an active sensor (not shown) of the device 202a is larger than a field of view 204b of an active sensor (not shown) of the device 202b. In such a scenario, at least one server (not shown) is configured to select an active illuminator (not shown) of the device 202a to project the sequence of light patterns. In an example, the device 202a may be one of at least two devices, and the device 202b may be another of the at least two devices.

In FIG. 2B, three devices 202a, 202b, and 202c are shown to be present in the same surroundings such that all the three devices 202a-202c are observing the surface 206 present in the same surroundings, the device 202c being located in between the devices 202a and 202b. A field of view 204c of an active sensor (not shown) of the device 202c overlaps the most with the fields of view 204a and 204b of the active sensors of the other devices 202a and 202b, respectively. In such a scenario, the at least one server is configured to select an active illuminator (not shown) of the device 202c to project the sequence of light patterns.

Referring to FIGS. 3A and 3B, illustrated are a simplified, exemplary first image 300 captured by a first device (not shown) and a simplified, exemplary second image 302 captured by a second device (not shown), respectively, in accordance with an embodiment of the present disclosure. A sequence of light patterns is projected by a first active illuminator (not shown) of the first device. The sequence of light patterns comprises light spots emitted sequentially, similar to an LED panel. A first active sensor (not shown) of the first device and a second active sensor (not shown) of the second device simultaneously sense reflections of the sequence of light patterns for capturing the first image 300 and the second image 302, respectively. The first image 300 represents the reflections of the sequence of light patterns comprising 36 light spots (depicted as a grid of 36 circular black dots), whereas the second image 302 represents the reflections of the sequence of light patterns comprising 34 light spots (depicted as a grid of 34 circular black dots). Herein, the first device is configured to analyse the first image 300 and the second image 302, based on a framerate (for example, equals to 3 milliseconds) at which new light spots are emitted, to determine an exposure time of the first active sensor (for example, equals to 108 milliseconds) and an exposure time of the second active sensor (for example, equals to 102 milliseconds). Moreover, a phase difference between the first active sensor and the second active sensor can also be determined from a difference in a position of a starting light spot in the first image 300 that corresponds to a row R2 and a column C1 and a position of a starting light spot in the second image 302 that corresponds to a row R2 and a column C4. In the depicted example, the phase difference is determined to be 9 milliseconds (=3×3 milliseconds). The first device is configured to send instructions to the second device to adjust i.e., to increase (according to above exemplary values) the exposure time of the second active sensor to match the exposure time of the first active sensor whilst reducing the phase difference.

It may be understood by a person skilled in the art that the FIGS. 2A, 2B, 3A and 3B are merely examples, which should not unduly limit the scope of the claims herein. The person skilled in the art will recognize many variations, alternatives, and modifications of embodiments of the present disclosure.

Referring to FIG. 4, illustrated are steps of a method for employing sequences of light patterns to synchronize cameras, in accordance with an embodiment of the present disclosure. The method is implemented by at least one server that is communicably coupled to a plurality of devices. At step 402, from each device, depth information indicative of shapes of surfaces present in surroundings of said device and optical depths of points on the surfaces with respect to said device are received, the depth information being generated by said device using an active illuminator and an active sensor of said device. At step 404, at least two devices from amongst the plurality of devices are detected in same surroundings, based on at least partial matching of respective depth information received from the at least two devices. At step 406, instructions are sent to the at least two devices to generate new depth information by controlling a first active illuminator of one of the at least two devices to project a sequence of light patterns on the same surroundings, whilst switching off a second active illuminator of another of the at least two devices, and by controlling a first active sensor of the one of the at least two devices and a second active sensor of the another of the at least two devices to sense simultaneously reflections of the sequence of light patterns off the same surroundings.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system comprising at least one server that is communicably coupled to a plurality of devices and is configured to:
   receive, from each device, depth information indicative of shapes of surfaces present in surroundings of said device and optical depths of points on the surfaces with respect to said device, the depth information being generated by said device using an active illuminator and an active sensor of said device;
   detect when at least two devices from amongst the plurality of devices are in same surroundings, based on at least partial matching of respective depth information received from the at least two devices; and
   send instructions to the at least two devices to generate new depth information by:
      controlling a first active illuminator of one of the at least two devices to project a sequence of light patterns on the same surroundings, whilst switching off a second active illuminator of another of the at least two devices, and
      controlling a first active sensor of the one of the at least two devices and a second active sensor of the another of the at least two devices to sense simultaneously reflections of the sequence of light patterns off the same surroundings.

2. The system of claim 1, wherein the one of the at least two devices is configured to:
capture at least one first image representing the reflections of the sequence of light patterns as sensed by the first active sensor;
receive, from the another of the at least two devices, at least one second image representing the reflections of the sequence of light patterns as sensed by the second active sensor, the at least one first image and the at least one second image being captured simultaneously;
analyse the at least one first image and the at least one second image, based on a framerate at which the light patterns of said sequence are projected, to determine an exposure time of the first active sensor, an exposure time of the second active sensor and a phase difference between the first active sensor and the second active sensor; and
send instructions to the another of the at least two devices to adjust the exposure time of the second active sensor to match the exposure time of the first active sensor whilst reducing the phase difference between the first active sensor and the second active sensor.

3. The system of claim 1, wherein the at least one server is configured to select the first active illuminator of the one of the at least two devices to project the sequence of light patterns, when the first active sensor has a larger field of view than a field of view of the second active sensor.

4. The system of claim 1, wherein the at least one server is configured to:
determine a device from amongst the at least two devices whose active sensor has a field of view that overlaps the most with fields of view of active sensors of other devices from amongst the at least two devices; and
select the determined device as the one of the at least two devices, wherein the active illuminator of the determined device is employed as the first active illuminator to project the sequence of light patterns.

5. The system of claim 1, wherein the at least one server is configured to:
receive, from the one of the at least two devices, information indicative of the light patterns in said sequence projected by the first active illuminator; and
send, to the another of the at least two devices, the information indicative of the light patterns.

6. The system of claim 1, wherein the at least one server is configured to:
determine relative poses of the at least two devices with respect to each other by using point-cloud registration on depth information received from the at least two devices; and
process the depth information received from the at least two devices, based on the relative poses of the at least two devices, to generate a three-dimensional model of the same surroundings.

7. The system of claim 1, wherein the at least one server is configured to:
determine relative poses of the at least two devices with respect to each other by using point-cloud registration on the depth information received from the at least two devices;
obtain information indicative of a pose of at least one of the at least two devices; and
determine poses of others of the at least two devices, based on the pose of the at least one of the at least two devices and the relative poses of the at least two devices.

8. The system of claim 1, wherein the instructions comprise at least one of:
time slots in which an active illuminator of a given device is to project the sequence of light patterns,
time slots in which an active sensor of the given device is to sense the reflections of the sequence of light patterns,
a framerate at which the active illuminator of the given device is to project the sequence of light patterns,
a framerate at which the active sensor of the given device is to sense the reflections of the sequence of light patterns,
a wavelength of light to be employed by the active illuminator of the given device,
a wavelength of light to be sensed by the active sensor of the given device,
the sequence of light patterns to be projected by the active illuminator of the given device,
the sequence of light patterns to be sensed by the active sensor of the given device.

9. A method implemented by at least one server that is communicably coupled to a plurality of devices, the method comprising:
receiving, from each device, depth information indicative of shapes of surfaces present in surroundings of said device and optical depths of points on the surfaces with respect to said device, the depth information being generated by said device using an active illuminator and an active sensor of said device;
detecting when at least two devices from amongst the plurality of devices are in same surroundings, based on at least partial matching of respective depth information received from the at least two devices; and
sending instructions to the at least two devices to generate new depth information by:
controlling a first active illuminator of one of the at least two devices to project a sequence of light patterns on the same surroundings, whilst switching off a second active illuminator of another of the at least two devices, and
controlling a first active sensor of the one of the at least two devices and a second active sensor of the another of the at least two devices to sense simultaneously reflections of the sequence of light patterns off the same surroundings.

10. The method of claim 9, further comprising sending instructions to the one of the at least two devices to:
capture at least one first image representing the reflections of the sequence of light patterns as sensed by the first active sensor;
receive, from the another of the at least two devices, at least one second image representing the reflections of the sequence of light patterns as sensed by the second active sensor, the at least one first image and the at least one second image being captured simultaneously;
analyse the at least one first image and the at least one second image, based on a framerate at which the light patterns of said sequence are projected, to determine an exposure time of the first active sensor, an exposure time of the second active sensor and a phase difference between the first active sensor and the second active sensor; and
send instructions to the another of the at least two devices to adjust the exposure time of the second active sensor to match the exposure time of the first active sensor whilst reducing the phase difference between the first active sensor and the second active sensor.

11. The method of claim 9, further comprising selecting the first active illuminator of the one of the at least two devices to project the sequence of light patterns, when the first active sensor has a larger field of view than a field of view of the second active sensor.

12. The method of claim 9, further comprising:
determining a device from amongst the at least two devices whose active sensor has a field of view that overlaps the most with fields of view of active sensors of other devices from amongst the at least two devices; and
selecting the determined device as the one of the at least two devices, wherein the active illuminator of the determined device is employed as the first active illuminator to project the sequence of light patterns.

13. The method of claim 9, further comprising:
receiving, from the one of the at least two devices, information indicative of the light patterns in said sequence projected by the first active illuminator; and
sending, to the another of the at least two devices, the information indicative of the light patterns.

14. The method of claim 9, further comprising:
determining relative poses of the at least two devices with respect to each other by using point-cloud registration on depth information received from the at least two devices; and
processing the depth information received from the at least two devices, based on the relative poses of the at least two devices, to generate a three-dimensional model of the same surroundings.

15. The method of claim 9, further comprising:
determining relative poses of the at least two devices with respect to each other by using point-cloud registration on the depth information received from the at least two devices;
obtaining information indicative of a pose of at least one of the at least two devices; and
determining poses of others of the at least two devices, based on the pose of the at least one of the at least two devices and the relative poses of the at least two devices.

16. The method of claim 9, wherein the instructions comprise at least one of:
time slots in which an active illuminator of a given device is to project the sequence of light patterns,
time slots in which an active sensor of the given device is to sense the reflections of the sequence of light patterns,
a framerate at which the active illuminator of the given device is to project the sequence of light patterns,
a framerate at which the active sensor of the given device is to sense the reflections of the sequence of light patterns,
a wavelength of light to be employed by the active illuminator of the given device,
a wavelength of light to be sensed by the active sensor of the given device,
the sequence of light patterns to be projected by the active illuminator of the given device,
the sequence of light patterns to be sensed by the active sensor of the given device.

* * * * *